United States Patent [19]
Graham

[11] Patent Number: 5,960,325
[45] Date of Patent: Sep. 28, 1999

[54] METHOD AND APPARATUS FOR CONSERVING ENERGY IN A RADIO COMMUNICATION SYSTEM

[75] Inventor: Jerry Lee Graham, Baldwin, Md.

[73] Assignee: Motorola, Inc., Schaumburg, Ill.

[21] Appl. No.: 08/847,137

[22] Filed: Apr. 30, 1997

[51] Int. Cl.[6] .................................................. H04Q 7/18
[52] U.S. Cl. ...................... 455/13.4; 455/38.3; 455/343; 340/825.44
[58] Field of Search ................................ 455/13.4, 38.3, 455/343, 38.2, 31.2, 70; 340/825.44; 370/324, 442, 459, 458

[56] References Cited

U.S. PATENT DOCUMENTS

| | | | |
|---|---|---|---|
| 5,382,949 | 1/1995 | Mock et al. ............................ | 455/38.3 |
| 5,440,299 | 8/1995 | Schwendeman ....................... | 455/38.3 |
| 5,535,207 | 7/1996 | Dupont ................................... | 455/38.3 |
| 5,537,407 | 7/1996 | Park et al. .............................. | 455/38.3 |
| 5,613,194 | 3/1997 | Olds et al. . | |

*Primary Examiner*—Nguyen Vo
*Assistant Examiner*—Lester G. Kincaid
*Attorney, Agent, or Firm*—James A. Lamb

[57] ABSTRACT

A radio communication system (5) includes transmitting unit (1) coupled to at least one controller (6). The controller (6) is adapted to combine message intervals (208) into a plurality of arrangements, each arrangement having a selected number of message intervals (208). An arrangement is then selected, and included in an acquisition group message. The arrangement is used for directing a number SCRs (selective call receivers) (2) targeted to receive the acquisition group message to monitor messages during the message reception interval (203) according to the arrangement. The controller (6) then invokes the transmitting unit (1) to transmit the acquisition group message to the SCRs (2). Messages targeted for specific SCR's (2) are then generated, and transmitted by way of transmitting unit (1) during the message reception interval (203) according to the arrangement selected. The targeted SCRs (2) intercept the messages according to the arrangement received in the acquisition group message.

25 Claims, 5 Drawing Sheets

METHOD AND APPARATUS FOR CONSERVING ENERGY IN A RADIO COMMUNICATION SYSTEM

FIELD OF THE INVENTION

This invention relates in general to radio communication systems, and particularly to a method and apparatus for conserving energy in the same.

BACKGROUND OF THE INVENTION

With the advent of new technologies such as portable radio selective call units and radio infrastructures for communicating messages thereto, individuals within domestic regions have been able to receive custom messages from other users at remote locations for sometime now. Typical forms of custom radio communications include, but are not limited to, electronic mail messages, paging messages and cellular telephony messages. Currently, most custom radio messaging systems are stationed on earth, and are limited geographically in their land coverage capacity.

Satellite communication systems, in contrast, have a substantial coverage capacity. It is for this reason that satellite communication systems have helped to revolutionize the dissemination of information worldwide. This is most apparent in the worldwide broadcasting of television signals. With potential for worldwide communication using satellite communication systems and with current advances in such systems, industry leaders have joined forces to develop worldwide satellite communication systems, which can provide cellular telephony services, paging services, and possibly much more.

An immediate problem faced by such consortiums is in the development of a satellite communication system which is cost effective to introduce, and cost effective to maintain. An additional challenge encountered by the communications industry is the development of satellite communication systems which support the use of selective call units that are compact and that have a battery life performance comparable to existing selective call units used domestically today. A key factor affecting cost, compactness, and battery efficiency of satellites and satellite-based selective call units is the type of communication protocol employed by a worldwide satellite communication system.

Accordingly, there is a substantial need for a communication protocol which provides a cost effective introduction and maintenance 5 of satellites and selective call units. Additionally, there is a need for a communication protocol which optimizes battery resources in the satellites and selective call units operating in a worldwide satellite communication system.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

DESCRIPTION OF THE PREFERRED EMBODIMENT

The signaling protocol, method, and apparatus to be described for the present invention is related to the satellite communication system described in U. S. Pat. No. 5,613,194 issued Mar. 18, 1997 to Olds et al., and entitled "Satellite-Based Cellular Messaging System and Method of Operation Thereof," assigned to the assignee of the present invention, and which is hereby incorporated by reference.

Figure 1:
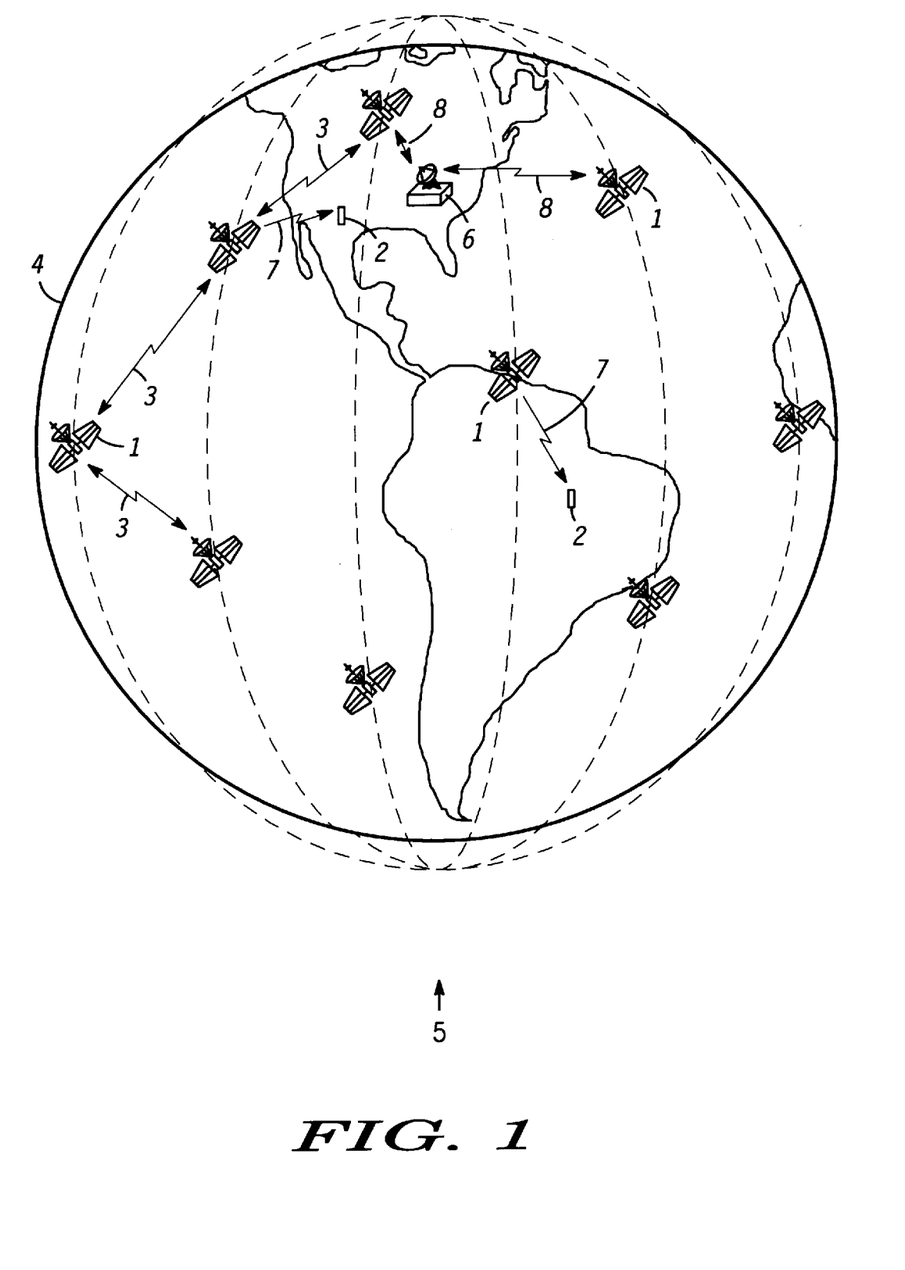
FIG. 1 shows a diagram of a radio communication system according to the present invention.

FIG. 1 shows an overview diagram of a radio communication system 5 according to the present invention. For simplicity, the radio communication system 5 is herein referred to as the system 5. Preferably the system 5 is a satellite communication system comprising at least one controller 6 coupled to a transmitting unit including at least one satellite 1 having a transmitter. It will be appreciated, however, that the present invention is also applicable to an earth-based radio communication system, wherein the transmitting unit is at least one earth-based conventional radio transmitter. Since the operation of either embodiment is substantially similar for the present invention, the ensuing discussions will focus on the embodiment of a satellite communication system.

According to FIG. 1, several satellites 1 are placed in a relatively low orbit around the earth 4. These satellites 1 are preferably placed in orbits so that the entire constellation of satellites 1 provides continual coverage for the entirety of earth 4. In addition to the satellites 1, the system 5 includes one or more controllers 6 stationed on earth 4. Each controller 6 is functionally equivalent to the operation of a central switching office (or "gateway"). For simplicity, each controller 6 is herein referred to as an office 6. Offices 6 reside on the earth's 4 surface and are in communication with nearby satellites 1 through RF communication links 8. Satellites 1 are also in communication with one another through data communication links 3. Through the constellation of satellites 1, an office 6 may control communications delivered to any size region on earth 4. Offices 6 couple to public switched telecommunication networks (not shown) through which requests for the placement of calls to subscribers of the system 5 may be received. Each office 6 receives requests to place calls to subscribers believed to be located in a region of earth 4 associated with that office 6. FIG. 1 shows only one office 6 for convenience.

However, it should be clear to those skilled in the art that any number of offices 6 may be employed in association with any number of regions on earth 4. It will be further appreciated that all offices 6 could operate in a distributed manner, or collectively in communication with one designated office 6 which relays messages from all offices 6 to the constellation of satellites 1 in the system 5.

The system 5 also includes any number, potentially in the millions, of SCRs 2 (selective call receivers) such as pagers or other one-way portable units. SCRs 2 are configured to receive communications from overhead satellites 1 over communication links 7. Preferably, links 7 utilize RF frequencies which accommodate substantially line-of-sight communication, and links 7 are simplex links. In other words, communications travel only in one direction from satellites 1 to SCRs 2. Simplex communication allows SCRs 2 to be manufactured as small inexpensive units that consume low amounts of power. No simplex communication limitation is implied with respect to links 3 or 8. Rather, these links are for satellite-to-satellite communication and office-to-satellite communication, respectively.

Figure 2:
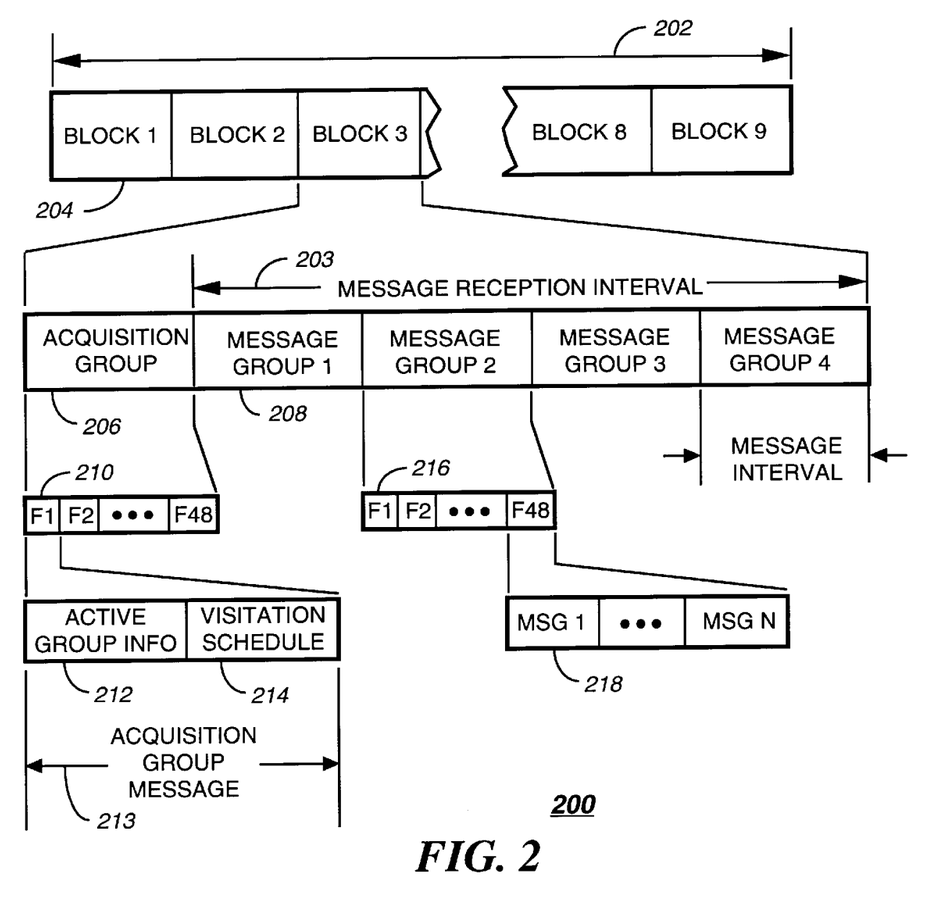
FIG. 2 shows a timing diagram depicting a communication protocol used by a satellite communication system according to the present invention.

FIG. 2 shows a timing diagram depicting a communication protocol 200 utilized by the system 5 for communicating with the SCRs 2 according to the present invention. During a communication cycle 202 (preferably having a duration of 194.4 sec), the communication protocol 200 comprises nine block intervals 204 (each preferably having a duration of 21.6 sec). Each block interval 204 is subdivided into an acquisition group message interval 206 immediately followed by a message reception interval 203 comprising four message intervals 208. Each of the SCRs 2 is assigned to one of the nine block intervals 204 for monitoring messages 218.

Generally, offices 6 control communications to large geographic regions on earth 4. In particular, offices 6 control satellite 1 transmissions to a plurality of cell regions. Each cell region is a subdivision of a large geographic region covered by an office 6. In order to track the location of SCRs 2 on earth 4, users of SCRs 2 must register their units when traveling between cell regions (e.g., cities) or when traveling between large regions covered by different offices 6 (e.g., countries). Since a cell region covered by an office 6 is substantially large, user registration of an SCR 2 is not often required during a user's stay at a particular region.

By assigning one block interval 204 to an SCR 2, the SCR 2 activates only during the assigned block interval 204. This, as shall be seen, hierarchically provides a first-level battery saving capability to the population of SCRs 2 and satellites operating in system 5. The acquisition group message interval 206 is used by the system 5 to transmit a plurality of acquisition group messages 213, each during a selected one of the 48 frames 210 shown in FIG. 2. Each acquisition group message 213 comprises an active group information field 212, and a visitation schedule field 214. These fields provide SCRs 2 information used for determining the manner in which messages are monitored during the message reception interval 203. It will be appreciated that additional fields may be used in the acquisition group message 213 such as, for example, a field that directs SCRs 2 to use a particular frequency channel selected from a plurality of possible frequency channels for intercepting messages. Additionally, it will be appreciated that the order of the fields 212, 214 is not relevant, and could be changed without affecting the operation of the communication protocol 200.

Similarly, each of the plurality of message intervals 208 comprise a plurality of message frames 216 (preferably 48 message frames 216). During each message frame 216 one or more messages 218 may be transmitted by the system 5 to one or more targeted SCRs 2. The visitation schedule field 214 comprises digital data, which directs targeted SCRs 2 to monitor messages in a selected number of the 48 message frames 216 during each of the plurality of message intervals 208.

To accomplish this, the visitation schedule field 214 comprises 48 bits of data. Each bit position in the visitation schedule field 214 has a direct correspondence with the 48 message frames 216 included in each of the message intervals 208. A logical "1" in any of the 48 bit positions in the visitation schedule field 214 indicates to an SCR 2 that it must monitor messages during each of the 48 message frames 216 corresponding to the bit positions set to a logical "1" during each of the four message intervals 208. For example, a logical "1" found in bit positions 16, 19, 40, and 43 and a logical "0" in all other bit positions, indicates to an SCR 2 that it must monitor messages during message frames 216 numbered as 16, 19, 40 and 43 (shown in FIG. 2) during each of the four message intervals 208. During all other message frames 216 (i.e., frames 1–15, 17–18, 20–39, 41–42 and 44–48), the SCRs 2 power down during each of the four message intervals 208.

As should be apparent from this description, the visitation schedule field 214 provides yet a second-level of battery saving capability in SCRs 2. Although the hierarchical combination of a block interval 204 assignment and the dynamic assignment of one or more message frames 216 by way of the visitation schedule field 214 results in a substantial battery saving capability in SCRs 2, the possibility exists for a high loss of energy under situations when the level of message traffic is low.

Figure 3:
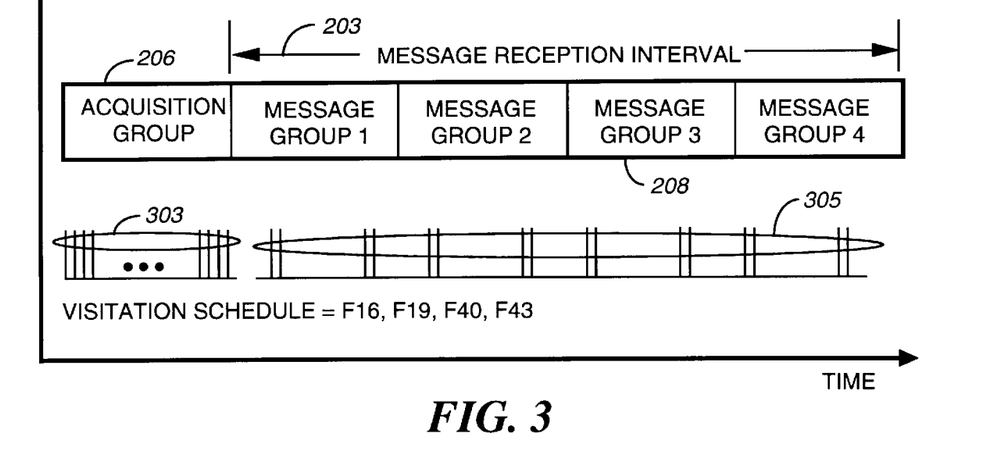
FIG. 3 shows a timing diagram illustrating how SCRs (selective call receivers), under low traffic conditions, could suffer a substantial loss of energy without full use of the communication protocol of the present invention.

FIG. 3 helps to illustrate this point. FIG. 3 shows, during a selected one of the block intervals 204, the acquisition group message interval 206 followed by the message reception interval 203, as presented in FIG. 2. Additionally, FIG. 3 shows, by graphical representation, the transmission of 48 acquisition group messages 213 (indicated by timing portion 303), each transmitted during a corresponding one of the 48 frames 210 included in the acquisition group message interval 206.

Assuming the present example corresponds to the first of nine block intervals 204, each of the SCRs 2 assigned to the 1st block interval 204 monitors for transmission of acquisition group messages 213 during each of the 48 frames 210 transmitted. Each SCR 2 preferably responds to the acquisition group message 213 having the highest detected radio energy. Since each transmission of an acquisition group message 213 is directed to one cell region, SCRs 2 will respond to the acquisition group message 213 corresponding to the cell region in which they are located.

FIG. 3 further shows, by way of example, how one or more SCRs 2 would monitor messages during the message reception interval 203. This example parallels the example provided above. That is, assume that one or more SCRs 2 located in a particular cell region intercept an acquisition group message 213 that includes a visitation schedule field 214 directing them to monitor messages during message frames 216 numbered as 16, 19, 40 and 43 during each of the four message intervals 208. Monitoring messages during these message frames 216 is represented by the timing portion 305. It is worth noting that a large number of SCRs 2 (e.g., in the 10's of thousands) located in the same cell region may be instructed to monitor messages during the frame periods illustrated in the timing portion 305.

Assuming that only a small fraction of these SCRs 2 (e.g., 500 units) are targeted to receive messages, it is possible that using the first and second message intervals 208 would be sufficient for transmitting these messages. Under this scenario, SCRs 2 targeted to receive messages will dissipate unnecessary energy during the third and fourth message intervals 208, and SCRs 2 not targeted to receive messages will dissipate energy during all four of the message intervals 208. It should be clear that under this example, battery life performance of SCRs 2 will be substantially impacted.

To solve this problem, the communication protocol 200 makes use of the active group information field 212 shown in FIG. 2. Similar to the visitation schedule field 214, the active group information field 212 includes digital data which directs targeted SCRs 2 to monitor messages during a selected number of the plurality of message intervals 208. Table 1 below illustrates, by way of example, the operation of the active group information field 212.

TABLE 1

| Active Group Information Field Data | Monitoring Arrangements of Message Intervals |
| --- | --- |
| 000 | 1 |
| 001 | 1, 2 |
| 010 | 1, 2, 3 |
| 011 | 1, 2, 3, 4 (all intervals) |
| 100–111 | none |

The first column of Table 1 corresponds to the active group information field 212, which in this example comprises 3 bits, thereby providing 1 of 8 possible instructions to SCRs 2. The second column includes the decoded instructions corresponding to the binary codes in the first column. Each instruction directs SCRs 2 to monitor messages during the message reception interval 203 in a particularized manner.

For example, a binary code of "000" instructs SCRs 2 to monitor messages "only" during the 1st message interval 208, thereby powering down during the 2d, 3d and 4th message intervals 208. A binary code of "001" instructs SCRs 2 to monitor messages "only" during the 1st and 2d message intervals 208. A binary code of "010" instructs SCRs 2 to monitor messages "only" during the 1st, 2d and 3d message intervals 208. A binary code of "011" instructs SCRs 2 to monitor messages during all four message intervals 208. And finally, any of binary codes "100–111" instruct SCRs 2 to "not" monitor messages during the message reception interval 203, in which case the SCRs 2 power down until the next cycle of their corresponding block interval 204.

It will be appreciated that although the active group information shown in Table 1 illustrates arrangements of sequential message intervals 208, non-sequential arrangements of message intervals 208 may be used. It will also be appreciated that more or less arrangements of a selected number of message intervals 208 may be used. Moreover, the bit codes used by the active group information field 212 may be shared with unused bit codes from other fields transmitted during the acquisition group message interval 206.

Figure 4:
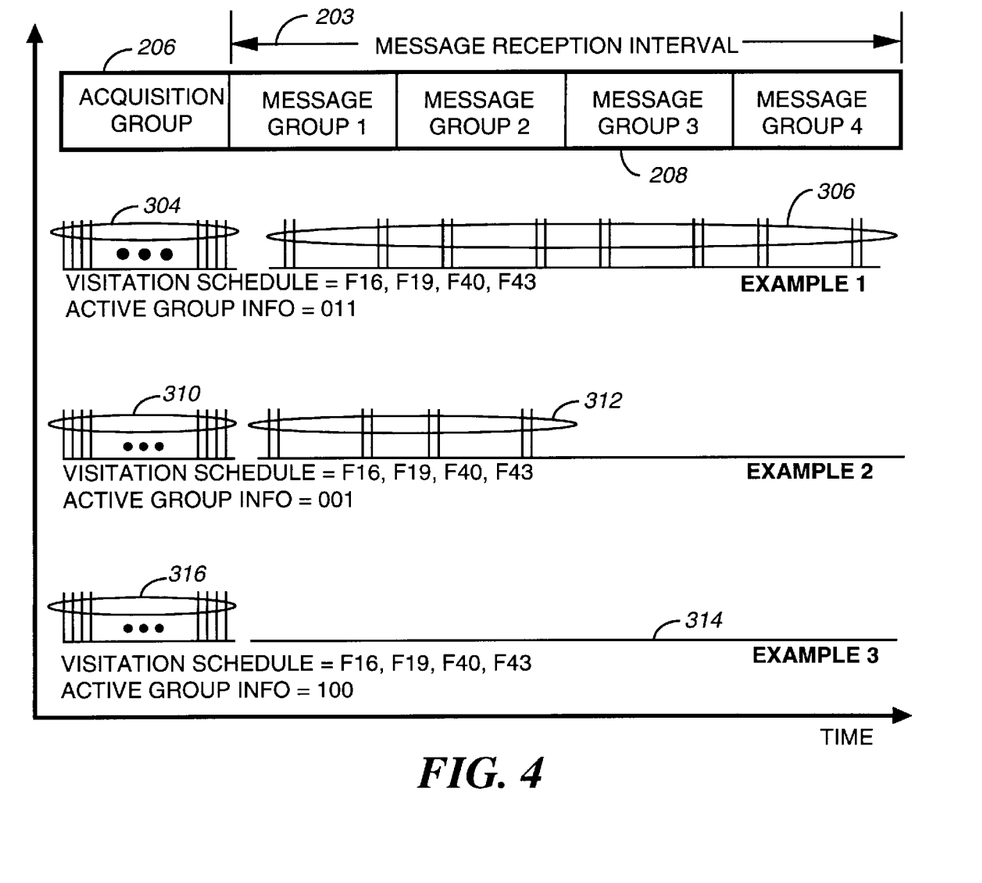
FIG. 4 shows a timing diagram illustrating how SCRs utilizing the communication protocol can preserve a substantial amount of energy according to the present invention.

Combining the function of the active group information field 212 and the visitation schedule field 214 results in a advantageous method for conserving energy in SCRs 2 during low message traffic conditions. FIG. 4 provides illustrative examples of the combined use of the active group information field 212 and the visitation schedule field 214. For each of the examples shown, the visitation schedule field 214 directs SCRs 2 to monitor data in the same manner presented in FIG. 3 (i.e., message frames 216 numbered as 16, 19, 40 and 43).

As noted earlier, the visitation schedule field 214 instructs SCRs 2 to monitor message frames 216 (not message intervals 208) in a particularized manner. In the first example shown, an acquisition group message 213 intercepted by SCRs 2 (from the 48 acquisition group messages 213-- indicated by timing portion 304—transmitted by the system 5) includes an active group information field 212 having the binary code "011", which directs SCRs 2 to monitor messages during all message intervals 208. The visitation schedule field 214 directs SCRs 2 to monitor message frames 216 numbered as 16, 19, 40 and 43. The effect of the instructions from these fields is illustrated by the timing portion 306. As noted in the discussion of FIG. 3, under heavy message traffic conditions the arrangement presented in example 1 is appropriate. However, under light traffic conditions where the volume of messages can be concentrated in the first two message intervals 208, example 1 can result in excessive losses of energy in the SCRs 2.

Example 2, shows how these losses of energy can be curtailed by the use of the active group information field 212. In this example, an acquisition group message 213 intercepted by SCRs 2 (from the 48 acquisition group messages 213—timing portion 310—transmitted by the system 5) includes an active group information field 212 having the binary code "001", which directs SCRs 2 to monitor messages during the first two message intervals 208, the visitation schedule field 214 remains unchanged. By directing all SCRs 2 to only the first two message intervals 208, the battery life performance of the SCRs 2 is substantial improved.

Example 3 illustrates the extreme situation when no message traffic is present. Under this scenario, an acquisition group message 213 intercepted by SCRs 2 (from the 48 acquisition group messages 213-indicated by timing portion 316—transmitted by the system 5) includes an active group information field 212 having the binary code "100", which directs SCRs 2 to power down during the entire message reception interval 203. It will be appreciated that, alternatively, all data bits of the visitation schedule field 214 could have been set to the binary bit code "0", thereby producing the same effect.

Figure 5:
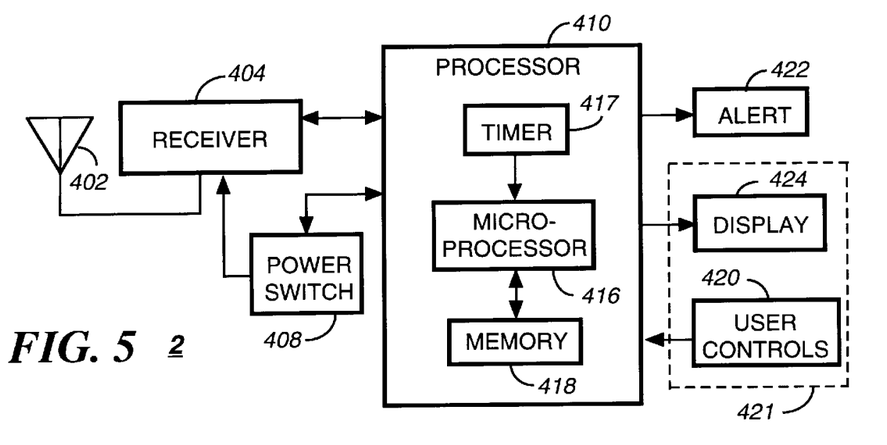
FIGS. 5 through 7 depict electrical block diagrams of an SCR, a controller and a satellite, respectively, according to the present invention.
Figure 6:
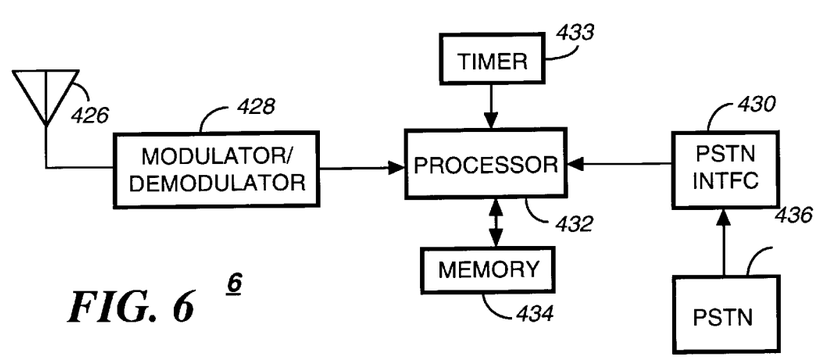
Figure 7:
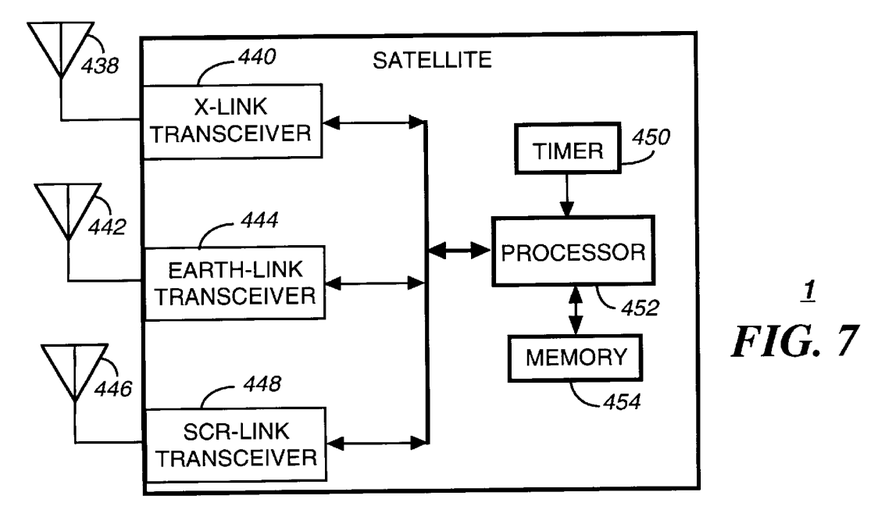

FIGS. 5 through 7 depict electrical block diagrams of the SCR 2, the controller 6 and the satellite 1, respectively, according to the present invention.

According to FIG. 5, the SCR 2 comprises a receiver 404 coupled to a conventional antenna 402, a power switch 408, a processor 410, and a user interface 421. The receiver 404 and antenna 402 (through which communication link 7 is established) are utilized for receiving radio signals including messages transmitted by the satellite communication system 5. Preferably the receiver 404 recovers bi-phase shift keying (BPSK) encoded data included in the transmission from link 7. The receiver 404 generates digital data, which is then processed by the processor 410. Based on the digital data provided by the receiver 404, the processor 410 is programmed to reject or accept the radio signal. The power switch 408 is a conventional switch, such as a MOS (metal oxide semiconductor) switch for controlling power to the receiver 404 under the direction of the processor 410, thereby providing a battery saving function.

The processor 410 is used for controlling operation of the SCR 2. Generally, its primary function is to decode and process demodulated messages provided by the receiver 404, storing them and alerting a user of the received message. The demodulated messages are preferably decoded by the processor 410 according to the communication protocol 200 presented in FIG. 2. To perform the decoding function, the processor 410 comprises a timer 417, a conventional microprocessor 416 coupled to a conventional memory 418 having nonvolatile and volatile memory portions, such as a ROM (read-only memory) and RAM (random-access memory). One of the uses of the memory 418 is for storing messages received from the system 5. Another use is for storing one or more selective call addresses utilized in identifying incoming personal or group messages to be intercepted by the SCR 2. Timer 417 allows the microprocessor 416 to keep a current system time and to act, so that transmissions are received from the controller 6 in accordance with real-time demands.

Once a message has been decoded and stored in the memory 418, the processor 410 activates the alerting device 422 (included in the user interface 421) which generates a tactile and/or audible alert signal to the user. The user interface 421, which further includes, for example, a conventional LCD display 424 and conventional user controls 420, is utilized by the user for processing the received messages. This interface provides options such as reading, deleting, and locking of messages.

FIG. 6 shows a block diagram of the controller 6 (which has also been referred to as a central switching office or gateway ) according to the present invention. The controller 6 includes a processor 432, which may be implemented by a single processor or by a network of processors. Processor 432 couples through a modulation/demodulation section 428 to an antenna 426. Antenna 426 is used in establishing communication link 8. Section 428 converts digital data produced (or used) by processor 432 into (or from) modulated RF communications compatible with link 8.

Controller 6 also includes a memory 434 which stores permanent and temporary data. Such permanent and temporary data include computer programs, data which do not change through operation of controller 6, and data which change through the operation of controller 6. A timer 433 also couples to processor 432. Timer 433 allows controller 6 to keep a current system time and to act, so that transmissions are sent from controller 6 in accordance with real-time demands. Through a public switched telecommunications network (PSTN) interface 430, processor 432 couples to PSTN 436. Requests to place calls to SCRs 2 may be received through PSTN 436 and interface 430. In addition, requests to place calls to SCRs 2 may be received through the network of satellites 1 (see FIG. 1) and link 8. Alternatively, other networks such as dedicated telephony lines, local area networks or wide area networks may be used.

FIG. 7 shows a block diagram of the satellite 1 according to the present invention. Preferably, all satellites 1 within system 5 (see FIG. 1) are substantially described by the block diagram of FIG. 7. Satellite 1 includes cross-link transceivers 440 and cross-link antennas 438. Transceivers 440 and antennas 438 support cross-links 3 (FIG. 1) to other nearby satellites 1. Gateway link transceivers 444 and gateway link antennas 442 support gateway links 8 (FIG. 1) to communicate with gateways 6.

Moreover, subscriber unit transceiver 448 and subscriber unit link antennas 446 support SCRs 2 by way of links 7 (FIG. 1). Preferably, each satellite 1 may simultaneously support links for up to a thousand or more of SCRs 2 (FIG. 1). Of course, those skilled in the art will appreciate that antennas 438, 442, and 446 may be implemented either as single multi-directional antennas or as banks of discrete antennas. It is desirable that subscriber unit antenna 446 be a phased-array antenna capable of accessing many cell regions simultaneously. In a preferred embodiment, up to forty-eight individual spot beams access an equal number of cell regions simultaneously.

A processor 452 couples to each of transceivers 440, 444, and 448 as well as to a memory 454 and a timer 450. Processor 452 may be implemented using one or more micro-processors. Processor 452 uses timer 450 to maintain the current date and time. Memory 454 stores data that serve as instructions to processor 452 and that, when executed by processor 452, cause satellite 1 to carry out procedures which are discussed in the controller 6 flowchart below (see FIG. 8). In addition, memory 454 includes variables, tables, and databases that are manipulated due to the operation of satellite 1.

Subscriber unit transceivers 448 are desirably multi-channel FDMA/TDMA (frequency division multiple access/time division multiple access) transceivers capable of transmitting and receiving on all different selectable frequencies during particular, selectable, time slots as directed by processor 452. Subscriber unit transceivers 448 have a sufficient number of channels to provide the desired number of transmission and reception frequencies for communications. Subscriber unit transceivers 448 desirably provide for transmission and reception on any frequency channel set, so that each subscriber unit transceiver 448 may, if needed, utilize the entire spectral capacity of all frequency channel sets by having the capability to handle all frequency and time slot assignments.

The subscriber unit transceivers 448 transmit the SCR signals at higher power than the general traffic, duplex carriers. This additional power provides improved link margin over the general traffic channels. This additional link margin enhances the ability of the SCR signals to penetrate obstacles such as vehicles and buildings. It also permits less sensitive, and thus less expensive, SCRs 2 to be used with the system 5.

Figure 8:
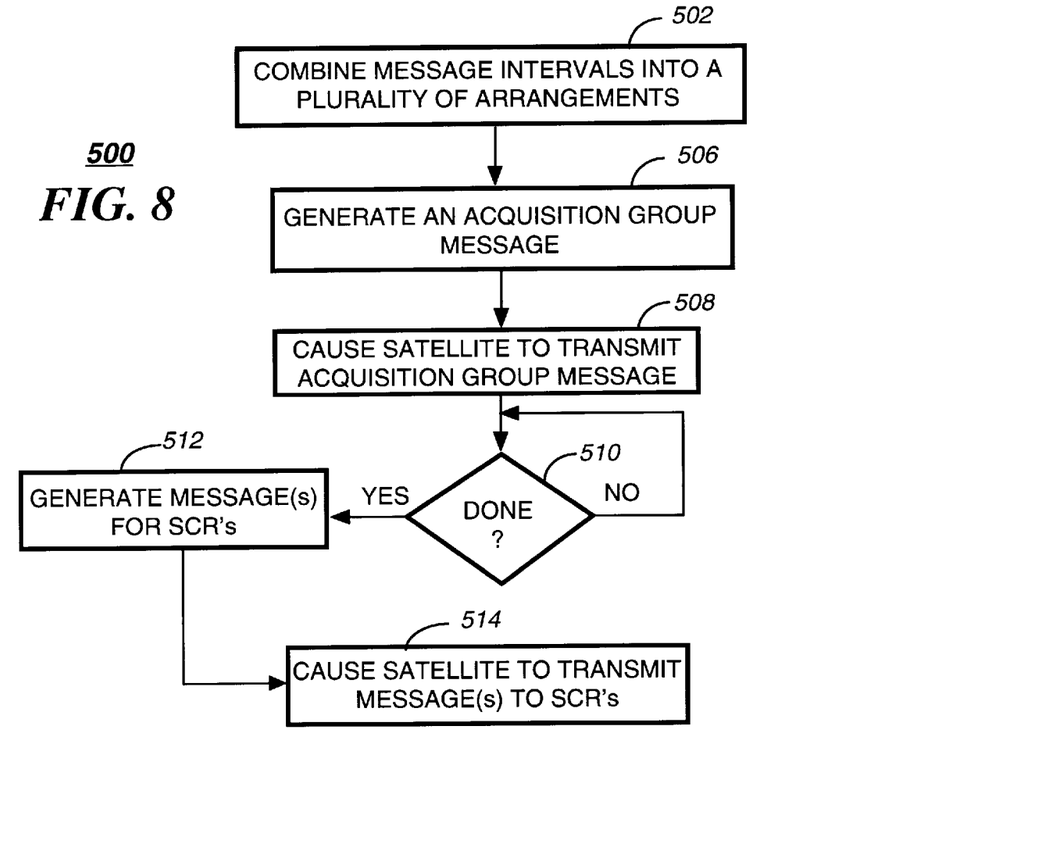
FIGS. 8 and 9 show flow charts depicting the operation of the controller and the SCR, respectively, according to the present invention.
Figure 9:
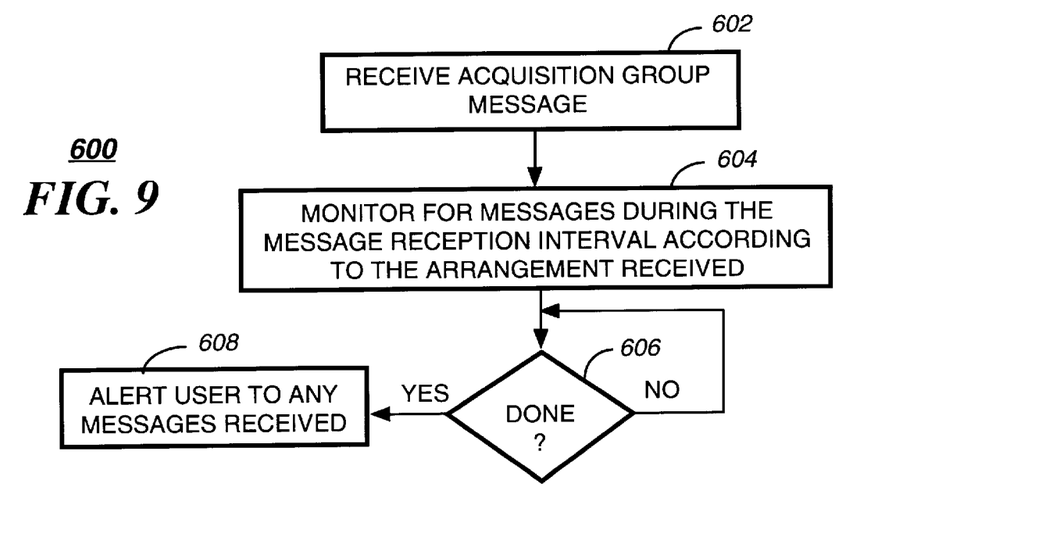

FIGS. 8 and 9 show flow charts 500, 600 depicting the operation of 20 the controller 6 and the SCR 2, respectively, according to the present invention. Flow charts 500, 600 depict programmed instructions of the controller 6 and SCR 2 which are stored in their respective memories 434,418.

The steps shown in flow chart 500 pertain to the operations of the controller 6 for a single block interval 204. Thus the discussion that follows is repeated by the controller 6 for each block interval 204.

Flow chart 500 begins with step 502 where the controller 6 combines the plurality of message intervals 208 into a plurality of arrangements, each arrangement comprising a selected number of message intervals 208. Table 1 provides an example of five arrangements. In step 506 the controller 6 generates a plurality of acquisition group messages 213 (preferably 48 messages for each controlled satellite 1—see FIGS. 2–4). Each acquisition group message 213 is designated for transmission during a selected one of the plurality of frames 210 of the acquisition group message interval 206.

To generate an acquisition group message 213, the controller 6 selects an arrangement from the plurality of arrangements, and includes in the acquisition group message 213, active group information corresponding to the arrangement. The active group information is included in the active group information field 212. The arrangement is used for directing a number of SCR's 2 targeted to receive the selected acquisition group message 213 to monitor one or more messages during the message reception interval 203 according to the selected number of message intervals 208 included in the arrangement.

Once the plurality of acquisition group messages 213 have been generated, the controller 6 proceeds to step 508 where it causes the satellite 1 to activate the transceiver 448 to transmit the plurality of acquisition group messages 213 during the acquisition group message interval 206. In step 510 the controller 6 generates one or more messages corresponding to one or more SCRs 2 assigned to the current block interval 204. Once the SCR messages have been generated, the controller 6 checks that the satellite 1 has completed transmission of the 48 acquisition group messages 213 in step 513. Once this has happened, the controller 6 proceeds to step 514 where it causes the satellite 1 to activate the transceiver 448 to transmit the one or more messages during the message reception interval 203 according to the arrangement selected for each of the one or more SCRs 2. Note all communications between the controller 6 and the satellites 1 are accomplished by way of communication links 8 and cross links 3.

Although not shown in FIG. 8, the controller 6 preferably instructs the satellites 1 to deactivate the transceiver 448 and to proceed to a power-saving mode during portions of the message reception interval 203 according to the arrangement transmitted with each of the plurality of acquisition group messages 213.

Directing the readers attention to FIG. 9, flow chart 600 begins with step 602 where the SCR 2 invokes the receiver 404 to monitor an acquisition group message 213 transmitted by a satellite 1. As described above, the acquisition group message 213 comprises the active group information, which directs the SCR 2 to a selected number of message intervals 208. In step 604, the SCR 2 causes the receiver 404 to monitor one or more messages during the message reception interval 203 according to the arrangement. Once a message is detected during the message reception interval 203, in step 606, the SCR 2 processes the messages as described above for FIG. 5 and proceeds to step 608. In step 608, the SCR 2 alerts its user of the pending messages received.

Although not shown in FIG. 9, the processor 410 of the SCR 2 is programmed to power down the receiver 404 and portions of the processor 410 during the message reception interval 203 according to the selected number of message intervals 208 directed by the acquisition group message 213. This operation corresponds to a battery-saving mode of the SCR 2. The combined instructions received from the active group information field 212 and the visitation schedule field 214 provide flexible means for optimizing the battery life of SCR's 2 under heavy or light message traffic conditions.

In sum, the present invention provides an advantageous method and apparatus for optimizing the battery life performance of both satellites 1 and SCR's 2. This is accomplish by the combined use of the active group information field 212 and the visitation schedule field 214. Together these fields provide controllers 6 the ability to optimize the battery life performance of satellites 1 and SCR's 2 in accordance with existing message traffic conditions.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a radio communication system, a method for transmitting messages to a plurality of SCRs (selective call receivers) during a message reception interval, the message reception interval comprising a fixed number of message intervals, the method comprising the steps of:

combining message intervals into a plurality of arrangements, each arrangement including a selected group of message intervals, wherein each of the fixed number of message intervals comprises a plurality of message frames;

selecting an arrangement from the plurality of arrangements;

generating an acquisition group message;

including in the acquisition group message, active group information corresponding to the arrangement, and a visitation schedule, wherein the arrangement included in the active group information directs a number of SCRs targeted to receive the acquisition group message to monitor at least one message during the message reception interval according to the selected group of message intervals included in the arrangement, and, wherein the visitation schedule directs SCRs to monitor messages during a selected number of the plurality of message frames for each of the fixed number of message intervals;

prior to the message reception interval, transmitting the acquisition group message to the SCRs;

generating one or more messages corresponding to one or more SCRs; and transmitting the one or more messages during the message reception interval according to the arrangement and the visitation schedule selected.

2. The method as recited in claim 1, wherein for each arrangement the selected number of message intervals are sequential.

3. The method as recited in claim 1, wherein the selected number of message intervals in a selected one of the plurality of arrangements is none.

4. The method as recited in claim 1, wherein the radio communication system comprises a satellite communication system including at least one controller coupled to at least one satellite having a transmitter.

5. The method as recited in claim 5, wherein the at least one controller instructs each satellite to proceed to a power-saving mode during portions of the message reception interval according to the selected number of message intervals in the arrangement.

6. In a radio communication system, a method for transmitting messages to a plurality of SCRs (selective call receivers), each SCR assigned to a selected one of a plurality of block intervals, each block interval comprising an acquisition group message interval and a message reception interval, the acquisition group message interval comprising a plurality of frames, the message reception interval comprising a fixed number of message intervals, the method comprising the steps of:

for a selected one of the plurality of block intervals, combining the fixed number of message intervals into a plurality of arrangements, each arrangement comprising a selected group of message intervals, wherein each of the fixed number of message intervals comprises a plurality of message frames;

generating a plurality of acquisition group messages, wherein each acquisition group message is designated for transmission during a selected one of the plurality of frames, and wherein generating a selected acquisition group message comprises the steps of:

selecting an arrangement from the plurality of arrangements, and including in the acquisition group message, active group information corresponding to the arrangement, and a visitation schedule, wherein the arrangement included in the active group information directs a number of SCRs targeted to receive the acquisition group message to monitor at least one message during the message reception interval according to the selected group of message intervals included in the arrangement, and,
wherein the visitation schedule directs SCRs to monitor messages during a selected group of the plurality of message frames for each of the fixed number of message intervals;
transmitting the plurality of acquisition group messages during the acquisition group message interval;
generating one or more messages corresponding to one or more SCRs assigned to the selected one of the plurality of block intervals; and
transmitting the one or more messages during the message reception interval according to the arrangement and the visitation schedule selected for each of the one or more SCRs.

7. The method as recited in claim 6, wherein for each arrangement the selected number of message intervals are sequential.

8. The method as recited in claim 6, wherein the selected number of message intervals in a selected one of the plurality of arrangements is none.

9. The method as recited in claim 6, wherein the radio communication system comprises a satellite communication system including at least one controller coupled to at least one satellite having a transmitter.

10. The method as recited in claim 9, wherein the at least one controller instructs each satellite to proceed to a power-saving mode during portions of the message reception interval corresponding to a selected one of the plurality of block intervals according to the arrangement transmitted with each of the plurality of acquisition group messages.

11. In a selective call receiver (SCR), a method for receiving messages transmitted by a transmitting unit during a message reception interval, the message reception interval comprising a fixed number of message intervals, the method comprising the steps of:
prior to the message reception interval, receiving an acquisition group message transmitted by the transmitting unit, the acquisition group message comprising active group information and a visitation schedule, the active group information corresponding to an arrangement of a selected group of message intervals, wherein each of the fixed number of message intervals comprises a plurality of message frames, and the visitation schedule directing the SCR to monitor messages during a selected group of the plurality of message frames for each of the fixed number of message intervals; and
monitoring for at least one message during the message reception interval according to the arrangement and the visitation schedule.

12. The method as recited in claim 11, wherein the selected number of message intervals are sequential.

13. The method as recited in claim 11, wherein the SCR proceeds to a battery-saving mode during the message reception interval according to the selected number of message intervals.

14. The method as recited in claim 13, wherein the transmitting unit comprises at least one satellite having a transmitter.

15. A radio communication system, comprising:
a transmitting unit for transmitting an acquisition group message and for transmitting messages to a plurality of SCRs (selective call receivers) during a message reception interval, the message reception interval comprising a fixed number of message intervals; and
at least one controller coupled to the transmitting unit, the at least one controller adapted to:
combine message intervals into a plurality of arrangements, each arrangement including a selected group of message intervals, wherein each of the fixed number of message intervals comprises a plurality of message frames;
select an arrangement from the plurality of arrangements;
generate an acquisition group message;
including in the acquisition group message, active group information corresponding to the arrangement, and a visitation schedule,
wherein the arrangement included in the active group information directs a number of SCRs targeted to receive the acquisition group message to monitor at least one message during the message reception interval according to the selected group of message intervals included in the arrangement, and,
wherein the visitation schedule directs SCRs to monitor messages during a selected group of the plurality of message frames for each of the fixed number of message intervals;
prior to the message reception interval, cause the transmitting unit to transmit the acquisition group message to the SCRs;
generate one or more messages corresponding to one or more SCRs; and
cause the transmitting unit to transmit the one or more messages during the message reception interval according to the arrangement and the visitation schedule selected.

16. The radio communication system as recited in claim 15, wherein the transmitting unit comprises at least one satellite having a transmitter.

17. The radio communication system as recited in claim 16, wherein the at least one controller instructs the at least one satellite to deactivate the transmitter and to proceed to a power-saving mode during portions of the message reception interval according to the selected number of message intervals in the arrangement selected.

18. The radio communication system as recited in claim 15, wherein the at least one controller is stationed on earth.

19. A radio communication system, comprising:
a transmitting unit for transmitting acquisition group messages and for transmitting messages to a plurality of SCRs (selective call receivers), each SCR assigned to a selected one of a plurality of block intervals, each block interval comprising an acquisition group message interval and a message reception interval, the acquisition group message interval comprising a plurality of frames, the message reception interval comprising a fixed number of message intervals; and
at least one controller coupled to the transmitting unit, the at least one controller adapted to:
for a selected one of the plurality of block intervals,
combine the fixed number of message intervals into a plurality of arrangements, each arrangement comprising a selected group of message intervals, wherein each of the fixed number of message intervals comprises a plurality of message frames;
generate a plurality of acquisition group messages, wherein each acquisition group message is designated for transmission during a selected one of the plurality of frames, and wherein generating a selected acquisition group message comprises the steps of:

select an arrangement from the plurality of arrangements, and include in the selected acquisition group message, active group information corresponding to the arrangement, and a visitation schedule, wherein the arrangement included in the active group information directs a number of SCRs targeted to receive the acquisition group message to monitor at least one message during the message reception interval according to the selected group of message intervals included in the arrangement, and, wherein the visitation schedule directs SCRs to monitor messages during a selected group of the plurality of message frames for each of the fixed number of message intervals;

cause the transmitting unit to transmit the plurality of acquisition group messages during the acquisition group message interval;

generate one or more messages corresponding to one or more SCRs assigned to the selected one of the plurality of block intervals; and cause the transmitting unit to transmit the one or more messages during the message reception interval according to the arrangement and the visitation schedule selected for each of the one or more SCRs.

20. The radio communication system as recited in claim 19, wherein the transmitting unit comprises at least one satellite having a transmitter.

21. The radio communication system as recited in claim 20, wherein the at least one controller instructs the at least one satellite to deactivate the transmitter and to proceed to a power-saving mode during portions of the message reception interval corresponding to a selected one of the plurality of block intervals according to the arrangement transmitted with each of the plurality of acquisition group messages.

22. The radio communication system as recited in claim 19, wherein the at least one controller is stationed on earth.

23. A selective call receiver (SCR), comprising:

a receiver for receiving messages transmitted by a transmitting unit during a message reception interval, the message reception interval comprising a fixed number of message intervals; and a processor coupled to the receiver, the processor adapted to:

prior to the message reception interval, cause the receiver to monitor an acquisition group message transmitted by the transmitting unit, the acquisition group message comprising active group information and a visitation schedule, the active group information corresponding to an arrangement of a selected group of message intervals, and the visitation schedule directing the SCR to monitor messages during a selected group of the plurality of message frames for each of the fixed number of message intervals; and cause the receiver to monitor at least one message during the message reception interval according to the arrangement and the visitation schedule.

24. The SCR as recited in claim 23, wherein the processor is further adapted to power down the receiver and portions of the processor during the message reception interval according to the selected number of message intervals.

25. The SCR as recited in claim 23, wherein the transmitting unit comprises at least one satellite having a transmitter.

* * * * *